United States Patent

Partin

[15] 3,676,847

[45] July 11, 1972

[54] CHARACTER RECOGNITION SYSTEM WITH SIMULTANEOUS QUANTIZATION AT A PLURALITY OF LEVELS

[72] Inventor: Melvin E. Partin, Montgomeryville, Pa.

[73] Assignee: Scan-Data Corporation, Norristown, Pa.

[22] Filed: June 15, 1970

[21] Appl. No.: 46,091

[52] U.S. Cl. ..340/146.3 AC, 340/146.3 AG, 340/146.3 MA

[51] Int. Cl. ....................G06k 9/10

[58] Field of Search....................340/146.3

[56] References Cited

UNITED STATES PATENTS

| | | | |
|---|---|---|---|
| 3,234,513 | 2/1966 | Brust | 340/146.3 AG |
| 3,104,372 | 11/1963 | Rabinow | 340/146.3 |
| 3,196,398 | 7/1965 | Baskin | 340/146.3 AG |
| 3,177,469 | 4/1965 | Chow | 340/146.3 J |

*Primary Examiner*—Maynard R. Wilbur
*Assistant Examiner*—William W. Cochran
*Attorney*—Caesar, Rivise, Bernstein & Cohen

[57] ABSTRACT

A character recognition system is provided which includes a plurality of quantizers for generating a binary quantization signal at a plurality of levels of a character pattern sampled within a field on a document. The character recognition system also includes means for sampling the character pattern at each of the plurality of levels of quantization substantially concurrently.

5 Claims, 19 Drawing Figures

Patented July 11, 1972 3,676,847

9 Sheets-Sheet 1

INVENTOR
MELVIN E. PARTIN
BY
Caesar, Rivise, Bernstein & Cohen
ATTORNEYS.

INVENTOR.
MELVIN E. PARTIN
BY
Caesar, Rivise, Bernstein & Cohen
ATTORNEYS.

INVENTOR
MELVIN E. PARTIN
BY
Caesar, Rivise, Bernstein & Cohen
ATTORNEYS.

INVENTOR.
MELVIN E. PARTIN
BY
Caesar, Rivise,
Bernstein & Cohen
ATTORNEYS.

INVENTOR
MELVIN E. PARTIN
BY
Caesar, Rivise, Bernstein & Cohen
ATTORNEYS.

Patented July 11, 1972 3,676,847

9 Sheets-Sheet 6

INVENTOR.
MELVIN E. PARTIN
BY
Caesar, Rivise, Bernstein & Cohen
ATTORNEYS.

INVENTOR
MELVIN E. PARTIN
BY
Caesar, Rivise, Bernstein & Cohen
ATTORNEYS.

INVENTOR.
MELVIN E. PARTIN
BY
Caesar, Rivise, Bernstein & Cohen
ATTORNEYS.

INVENTOR
MELVIN E. PARTIN
BY
Caesar, Rivise, Bernstein & Cohen
ATTORNEYS.

CHARACTER RECOGNITION SYSTEM WITH SIMULTANEOUS QUANTIZATION AT A PLURALITY OF LEVELS

This invention relates generally to character recognition systems and more particularly to a character recognition system with simultaneous quantization at a plurality of levels. This invention is an improvement in a Character Recognition System Utilizing Feature Extraction which is the subject of and disclosed in co-pending application, Ser. No. 774,280, filed Nov. 8, 1968 now U.S. Pat. No. 3613080, which application is hereby incorporated by reference. However, the invention is also applicable to conventional character recognition systems.

In conventional optical character recognition systems as well as the system disclosed in the aforementioned application, Ser. No. 774,280 now U.S. Pat. No. 3613080, optical information is converted to electrical information which has an output in the form of an analog video electrical signal created as a function of a scan pattern. That is, as the beam of the optical scanning unit passes over the field, the light therefrom is reflected to a photomultiplier which produces an analog signal representative of the amount of reflected light from the optical scanning means. The video signal, as it is called, is then quantized to binary form as a function of amplitude.

The amplitude is, of course, dependent on the amount of reflected light which is determined by the lightness or darkness of the field. The amplitude of the signal may therefore vary substantially from one document to another, within documents, from one character to another and even within the character itself. The causes, of course, are paper and ink variations in reflectivity, boldness of print, print quality, and contrast between the character darkness and the background. It is therefore often desirable to change the quantization level if a character is not recognized by the character recognition circuitry and another attempt to recognize the character is made. In prior systems, this is done by rescanning the character. However, rescanning of the character takes time and therefore reduces the speed of the character recognition. Moreover, in rescanning, it is necessary to rescan the entire character at a different quantization level. If a character is not struck smoothly or if there is a variation in the height of the paper from one portion of the character to another, it is impossible for conventional character recognition systems to recognize the character having the aforementioned variation in print.

It is therefore an object of the instant invention to overcome the aforementioned disadvantages.

Another object of the invention is to provide a new and improved character recognition system with simultaneous quantization at a plurality of levels.

Another object of the invention is to provide a new and improved character recognition system which utilizes means responsive to a plurality of levels of quantized signals for recognizing characters.

Yet another object of the invention is to provide a new and improved character recognition system which utilizes a pair of shift registers having coded signals representative of a plurality of quantization levels of a field scanned by a document scanner.

Another object of the invention is to provide a new and improved character recognition system which has an increased power of character recognition.

These and other objects of the invention are achieved by providing a character recognition system with simultaneous quantization at a plurality of levels. The system includes means for generating a binary quantization signal at a plurality of levels of a character pattern sampled within a field on a document. The quantization signals at each of the levels are fed to an encoder which provides in a pair of shift registers a coded signal representative of the plurality of quantized levels. Masks are connected to the shift register via gating circuitry so that features can be detected in the character at each of the plurality of quantization levels.

Other objects and many of the attendant advantages of this invention will be readily appreciated as the same becomes better understood by reference to the following detailed description when considered in connection with the accompanying drawings wherein.

Figures 6, 10:
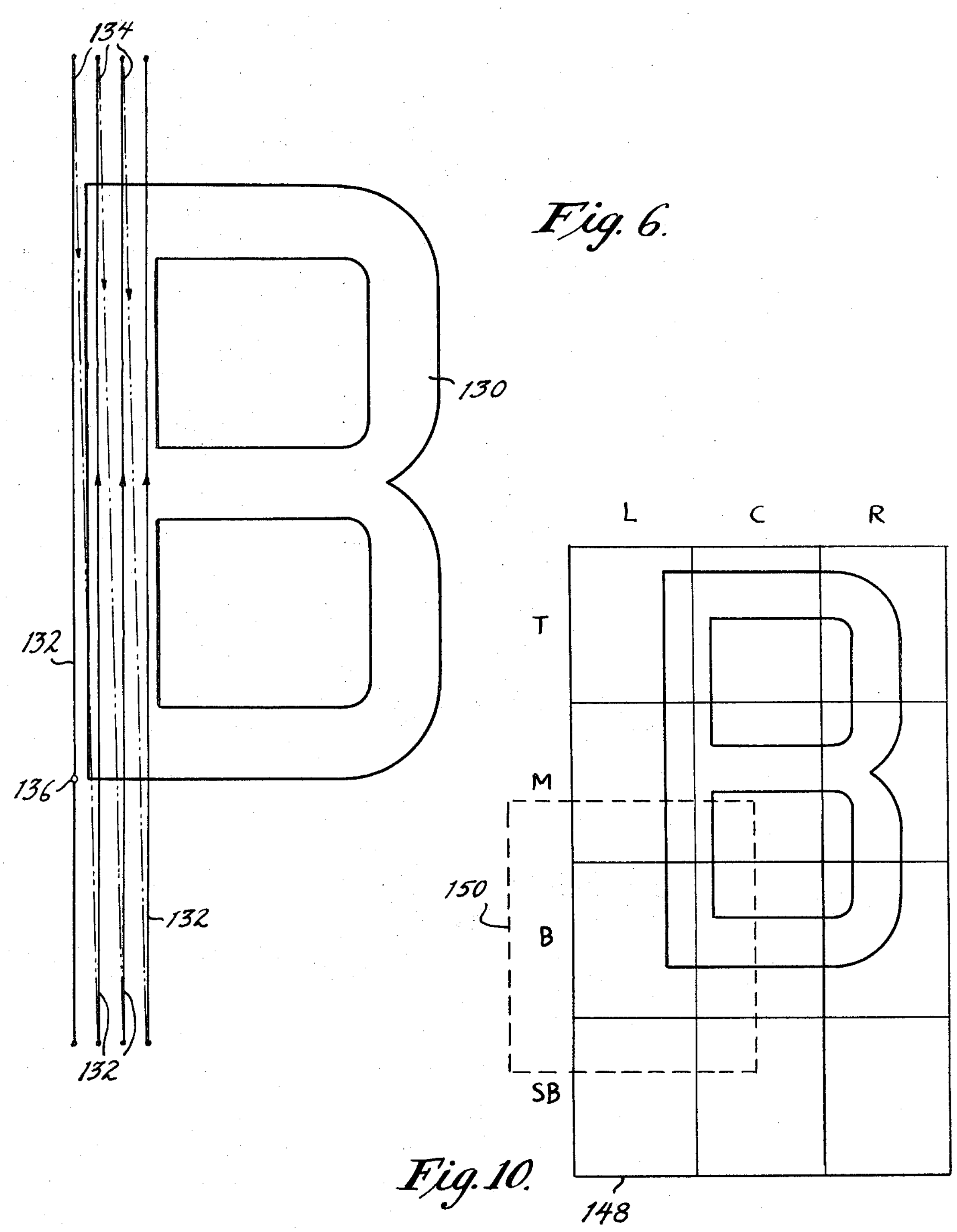
FIG. 6 is a diagrammatic illustration of a character on a field of a document being scanned by a flying spot scanner.
Figure 12:
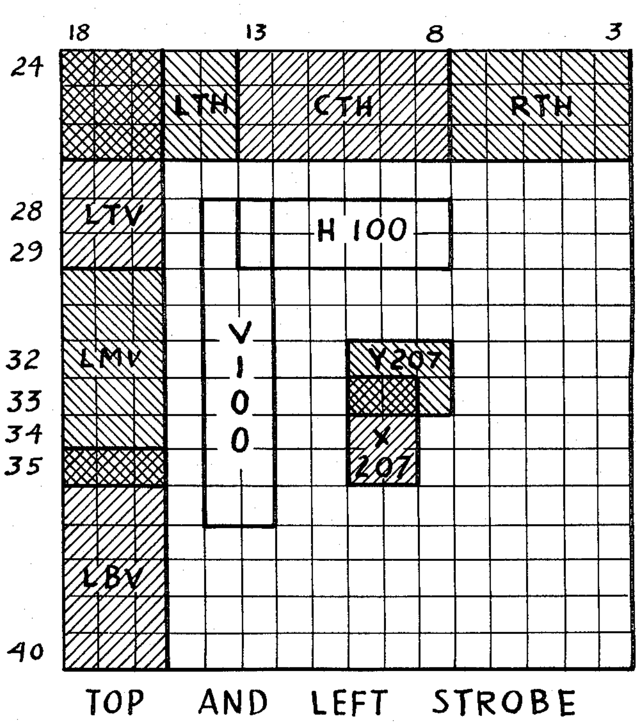
Figure 11:
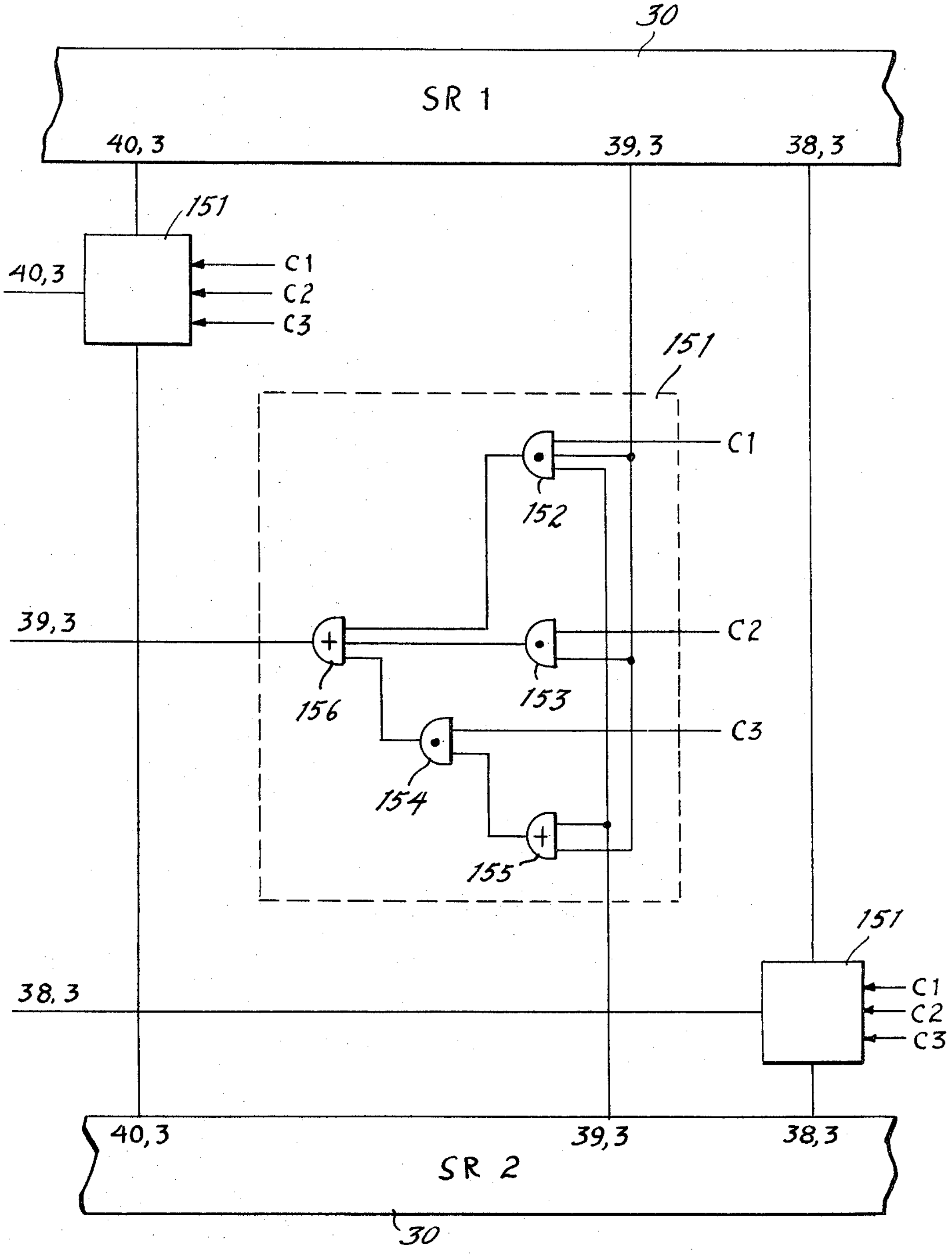

FIG. 10 graphically depicts the field on a document which has been divided into twelve zones;

FIG. 11 is a schematic block diagram showing a portion of the video shift registers SR1 and SR2 with a portion of the control gating to illustrate the connection therebetween;

FIG. 12 is a diagrammatic representation of the sub-feature masks which are necessary to detect the feature in the top lefthand corner of the upper case character "B;"

Figures 13, 14:
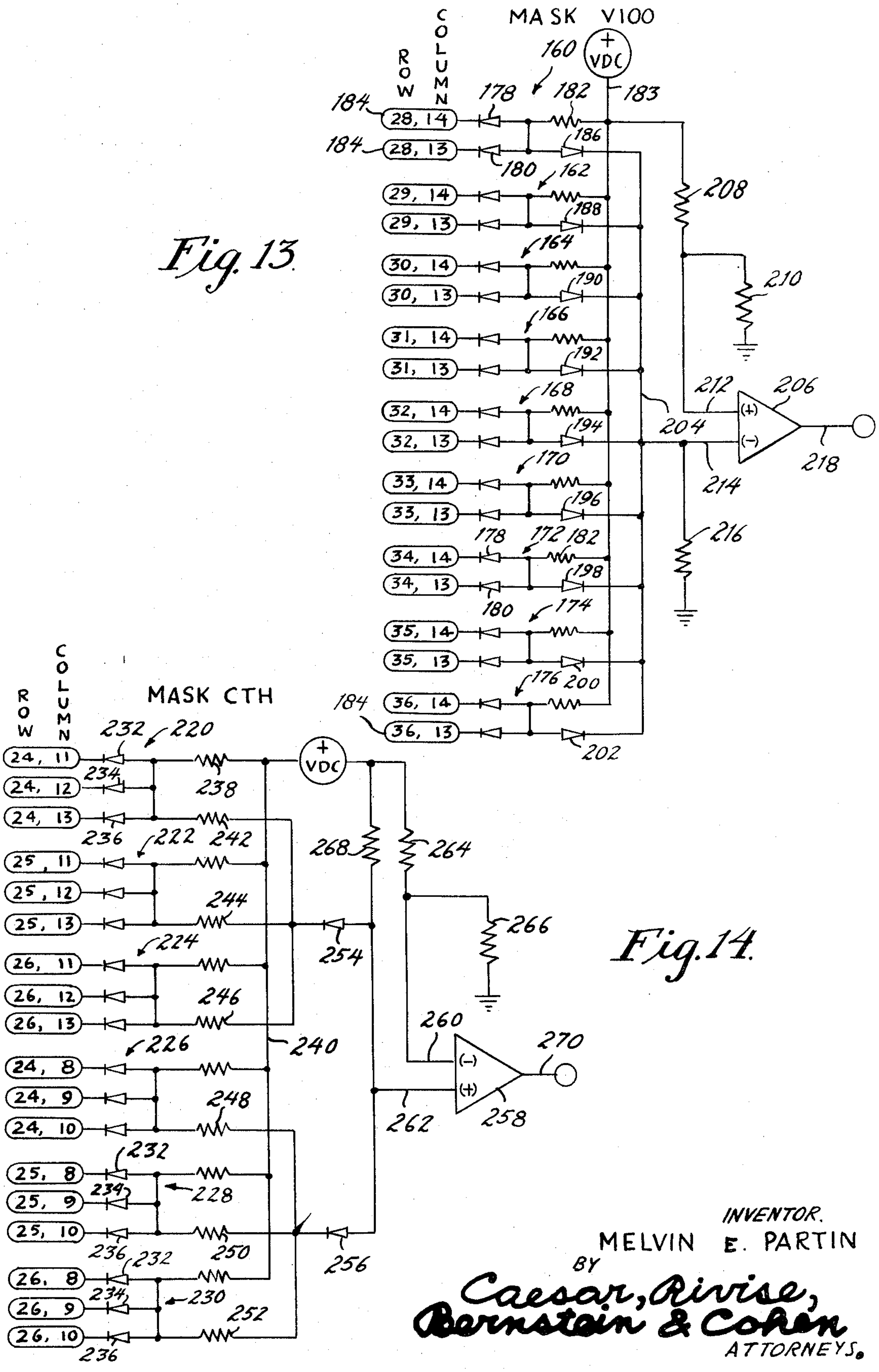
Figure 15:
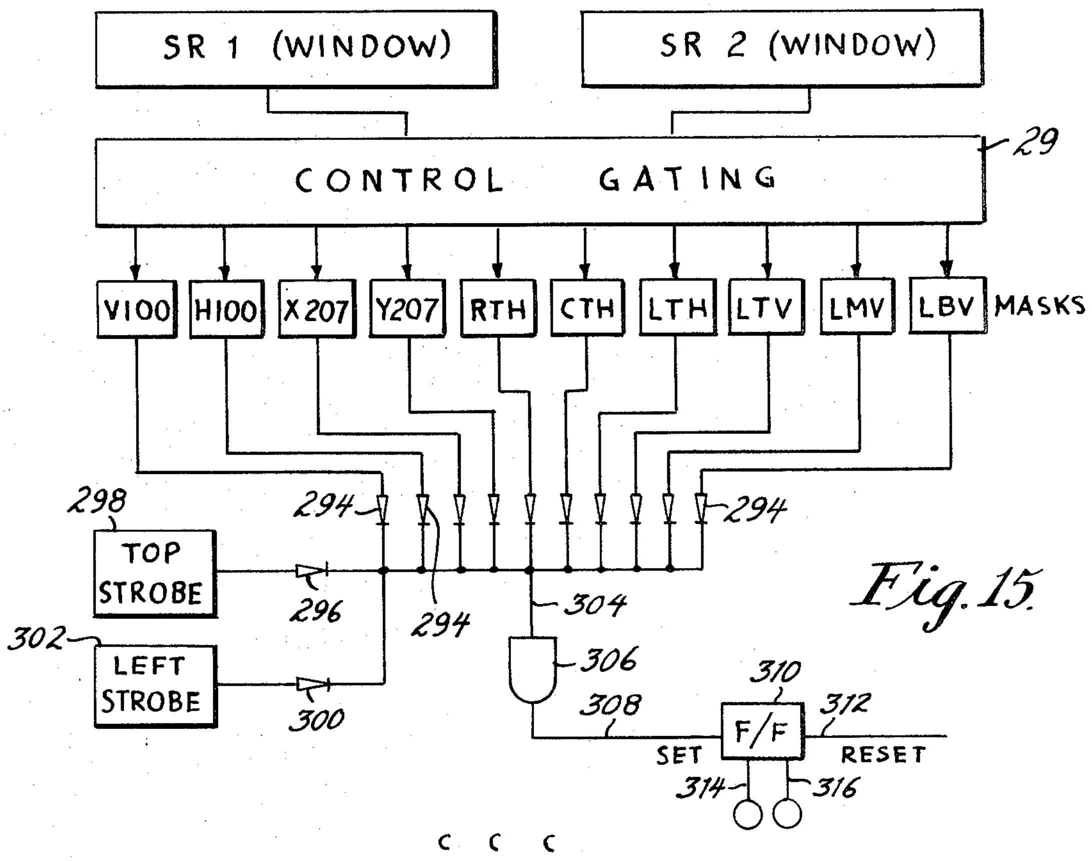
Figure 16:
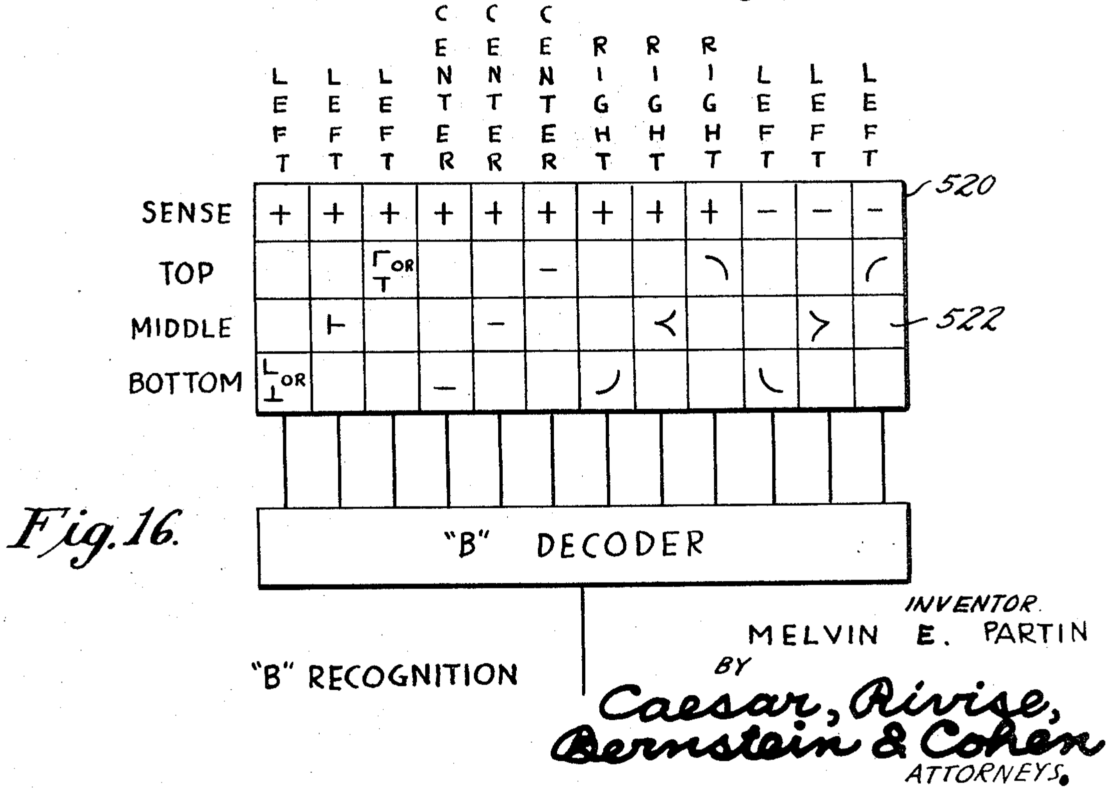

FIG. 13 is a schematic diagram of a positive sub-feature mask;

FIG. 14 is a schematic block diagram of a negative sub-feature mask;

FIG. 15 is a schematic block diagram of a feature detector for the top lefthand corner feature of the upper case character "B;" and FIG. 16 is a schematic block diagram of a character "B" decoder which illustrates the operation of the character decoders.

Figure 1:
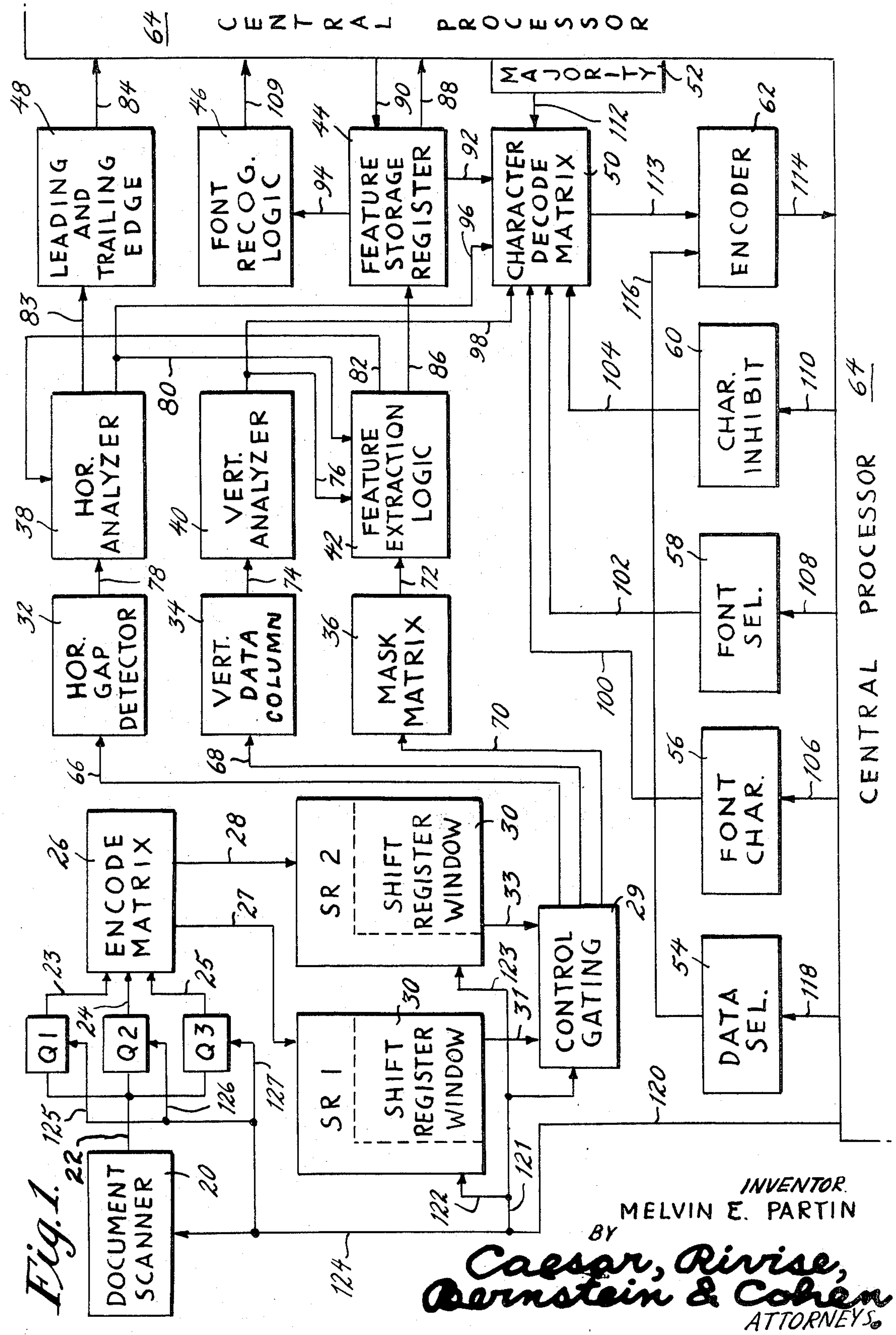
FIG. 1 is a schematic block diagram of a character recognition system with simultaneous quantization at a plurality of levels embodying the invention.

Referring now in greater detail to the various figures of the drawing wherein similar reference characters refer to similar parts, a character recognition system with simultaneous quantization at a plurality of levels embodying the invention is shown generally in FIG. 1. For purposes of clarity, the control circuitry associated with the various components of the system have been omitted.

The character recognition system basically comprises a document scanner 20 which includes means for handling the document and means for scanning the characters on a document. A preferred embodiment of the document handler is shown in co-pending application, Ser. No. 734,777, filed June 5, 1968 entitled Document Handler. The means for scanning the document in the document scanner 20 preferably comprises a flying spot scanner for scanning individually each of the characters provided on a document.

The output of the document scanner which is generated by a photomultiplier therein is fed by line 22 to a plurality of quantizers Q1, Q2 and Q3.

The output signal from document scanner 20 is an analog signal which is quantized by the quantizers Q1, Q2 and Q3. Each of the quantizers is set at a different level so that a binary quantization of the character pattern is provided at three different levels.

Figure 2A:
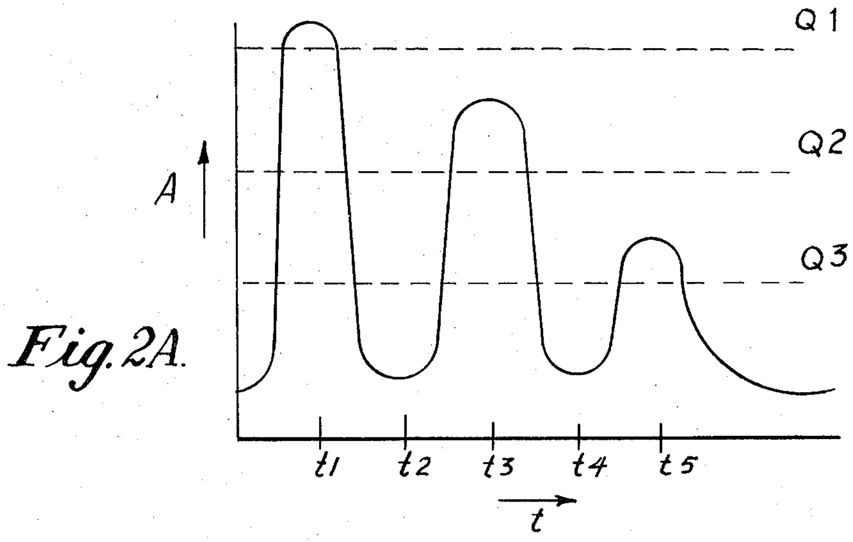
FIGS. 2A, 2B, 2C and 2D are diagrammatic graphical representations illustrating quantization at a plurality of levels.

An example of an analog video signal derived from scanning a pattern is shown as a function of time in FIG. 2A. For purposes of illustration, it is assumed that the darker or blacker the video, the greater is the amplitude of the signal. It should also be noted that three dotted lines labeled Q1, Q2 and Q3 represent the levels of the quantization of the quantizers Q1, Q2 and Q3 shown in FIG. 1.

Figure 2B:
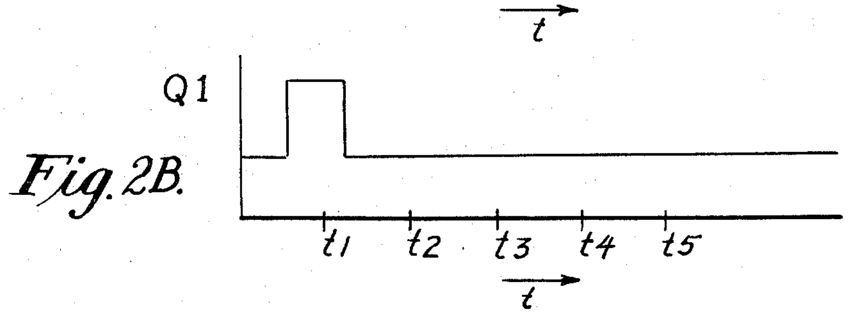
Figure 2C:
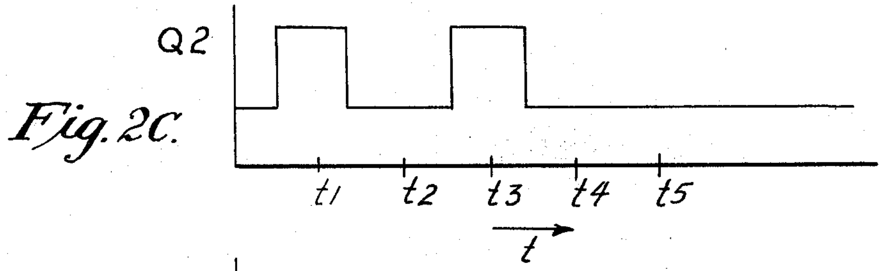
Figure 2D:
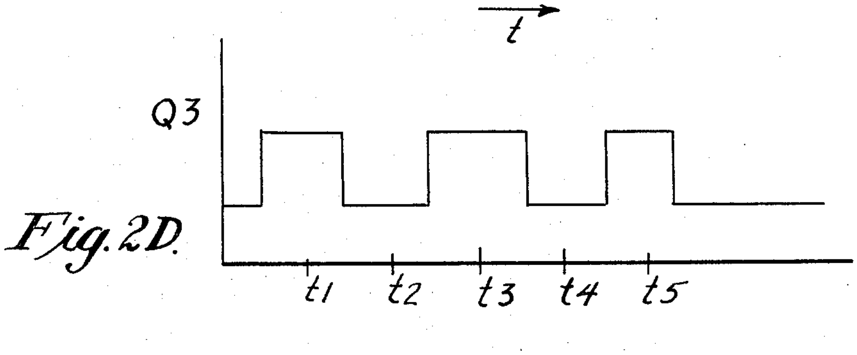

The output signal of Q1, as a function of time, is illustrated in FIG. 2B. The output of quantizer Q2 is illustrated in FIG. 2C and the output of quantizer Q3 is illustrated in FIG. 2D.

It should be noted that the signals for Q1, Q2 and Q3 are high only when the analog voltage is a greater amplitude than the quantization level at which the quantizers Q1, Q2 and Q3 are set. Thus, if it is assumed that quantizers Q1, Q2 and Q3 are sampled at times *t*1, *t*2, *t*3, *t*4 and *t*5, the binary representation of the outputs of the quantizers Q1, Q2 and Q3 on lines 23, 24 and 25, respectively, are as follows:

CHART I

| Line | *t*1 | *t*2 | *t*3 | *t*4 | *t*5 |
|---|---|---|---|---|---|
| 23 (Q1) | 1 | 0 | 0 | 0 | 0 |
| 24 (Q2) | 1 | 0 | 1 | 0 | 0 |
| 25 (Q3) | 1 | 0 | 1 | 0 | 1 |

Figure 3:
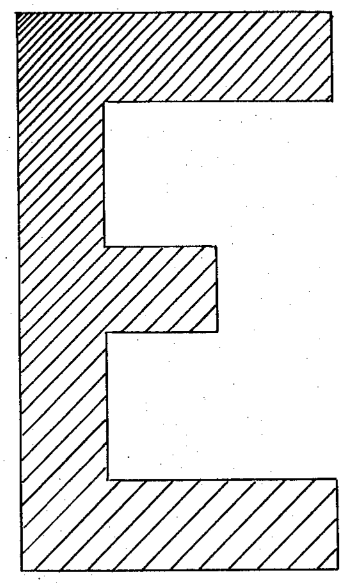
FIG. 3 is a diagrammatic top plan view of a printed character on a field of a document.
Figure 4:
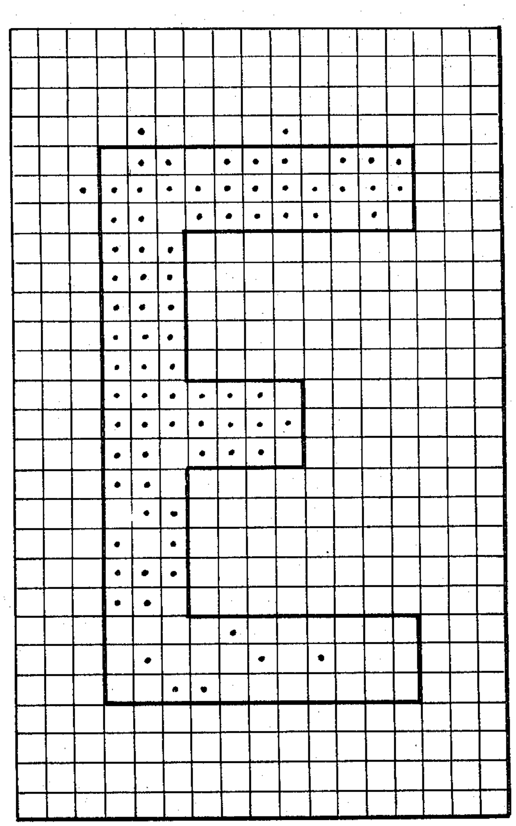
FIG. 4 is a diagrammatic representation of the quantization of a field which has been scanned which includes the character shown in FIG. 3.
Figure 5:
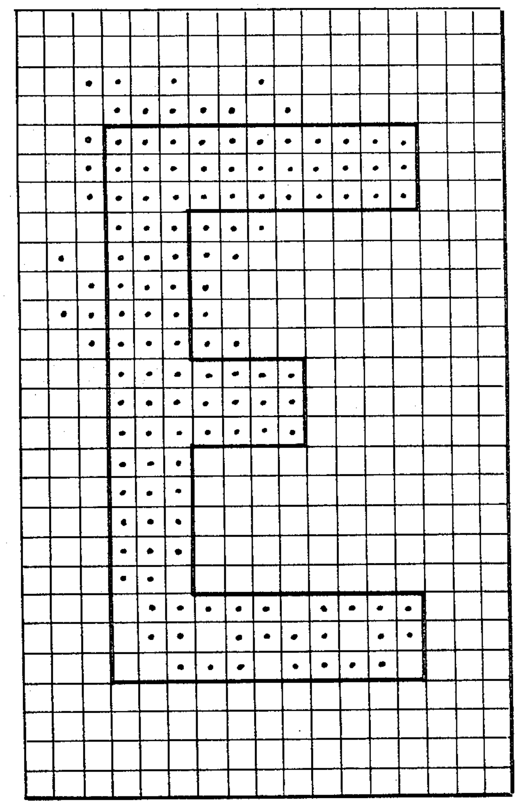
FIG. 5 is a diagrammatic representation of the quantization of the same field quantized in FIG. 4 at a different level of quantization.

The significance of the quantization level is best understood with reference to FIGS. 3, 4 and 5. FIG. 3 is an idealized representation of a printed letter E which has either been struck off-center or has been printed on a sheet or document which is not perfectly planar. Thus, for example, it should be noted that the shading is darker towards the upper left corner of the character "E" to indicate that the upper lefthand corner of the character "E" is the darkest portion and the lower righthand corner is substantially lighter than the upper lefthand corner. Of course, it is also assumed that there are various gradations in the coloring due to the variations in surface of the documents.

FIG. 4 is a diagrammatic representation of the quantization of a field which has been scanned which included the character "E" shown in FIG. 3. The rectangular borderline in FIG. 4 represents the limit of the field that was scanned and each of the boxes within the borderline represents the quantization of the sample taken at the area in the field in which the character "E" was scanned. Each box that is blank represents an area at which the reflectivity signal was lower or lighter than the quantization level. Each blank having a dot therein represents an area in the field which was sampled and found to be darker than the quantization level. The outline of the letter "E" corresponds to the ideal character "E" which would always be detected and recognized as the character "E" by character recognition circuitry if everything within the border were completely black and everything outside of the border were completely white.

The level of quantization represented in FIG. 4 is a high level of quantization such as level Q1 in FIG. 2A. Accordingly, it can be seen that only the darkest areas of the letter "E" in the upper lefthand corner thereof was dark enough to be recognized as dark areas in the quantization.

The lower righthand corner of the "E" is substantially blank due to the fact that the bottom righthand corner of the "E" in FIG. 3 was too lightly struck to be recognized at a high quantization level. Accordingly, because of the fact that the bottom leg of the "E" was omitted by a high level quantization, a conventional character recognition system receiving quantization signals based on the quantization level shown in FIG. 4 would fail to recognize the character "E" or, in the alternative, would incorrectly identify the character "E" as the character "F."

If the character recognition circuitry is sophisticated enough to recognize the fact that the vertical bar for the character "F" is too short as a result of the lack of black quantization at the bottom thereof, the character "E" in FIG. 3 is again scanned at a lower quantization level such as level Q2 or Q3.

Referring now to FIG. 5, a diagrammatic representation of the field including the character "E" of FIG. 3 is shown wherein the quantization level has been reduced to the level of quantization Q3. In this case, it can be seen that more black video has been incorporated due to the fact that the level of darkness is above the quantization level in the lower leg of the character "E." It should be noted, however, that due to the low level of quantization, spill-off from the ink which is used to print the character "E" in the upper lefthand corner of the character "E" causes extra black video around the idealized outline of the character "E." Thus, although the bottom portion of the character "E" could easily be recognized by character recognition circuitry, the upper lefthand corner of the character "E" would be difficult to determine because the feature was distorted by the extra black video around the upper lefthand corner.

In the instant invention, the quantization at each of the three levels shown in FIG. 2A is presented to the character recognition circuitry which is of the type shown in the aforementioned application entitled Character Recognition System Utilizing Feature Extraction, application, Ser. No. 774,280 now U.S. Pat. No. 3613080. Thus, because each of the three quantization levels are presented to the character recognition circuitry utilizing feature extraction on a time division basis, if the feature is recognized in any of the quantization levels, it is retained for the purpose of character recognition.

For example, in quantization level Q1, the upper lefthand corner of the character "E" shown in FIG. 3 has just the right amount of black video to have the character recognition system easily determine that the top leg, the upper lefthand corner, the middle leg and the vertical bar are present. In quantization level Q3, the bottom leg of the letter "E" includes enough black video that it can be detected. It should also be noted that there is enough black video in the middle leg without extra black video around the edges for that to be detected thereby providing redundant information during the quantization level Q3. However, even though the upper lefthand corner is distorted due to the extra black video around the edges, the feature is retained because it was recognized during the level of quantization Q1.

It can therefore be seen that providing a plurality of quantization levels on a time division basis to the character recognition circuitry as the binary quantization signals of the video scanned are presented to the character recognition circuitry increases the power of recognition of the character recognition circuitry.

It should also be understood that even though three levels of quantization are fed to the character recognition circuitry, no time is lost in scanning due to the fact that the gating circuitry utilized in the character recognition circuitry is far faster than the speed at which the optical character recognition scanning can take place. Accordingly, ample time is available in the character recognition circuitry for presenting the quantization levels to the character recognition circuitry on a time division basis as the scanning patterns are provided in the video shift registers connected with the character recognition circuitry.

Referring back to FIG. 1, it can be seen that lines 23, 24 and 25 of quantizers Q1, Q2 and Q3 are connected to an encode matrix 26. The encode matrix is provided so that only two video shift registers are required to handle all three levels of quantization. The coded quantization levels are provided on output lines 27 and 28 of the encode matrix 26. Output line 27 is connected to a first video shift register SR1 and line 28 is connected to the input of a second video shift register SR2.

As seen in FIG. 1, a portion of the video shift registers SR1 and SR2 are shown within dotted lines and labeled shift register window. The shift register windows 30 of SR1 and SR2 are a portion of the shift registers and all of the information which passes through shift registers SR1 and SR2 passes through the shift register window 30. As will hereinafter be seen in greater detail, the entire character is thus shifted through the shift register window 30 and the shift register window is therefore the only portion of the shift registers SR1 and SR2 which is looked at by the feature extraction circuitry. In accordance with the features that pass through the shift register windows, the entire character is recognized by the recognition circuitry.

The character recognition circuitry is connected to the shift register windows 30 via control gating 29 which is connected to the outputs of shift register windows 30 via lines 31 and 33. The control gating is adapted to decode the information in shift registers SR1 and SR2 so that three levels of quantization are provided to the character recognition circuitry during the period between each shift pulse to the shift registers SR1 and SR2. Thus, the character recognition circuitry samples the pattern in the shift register at three levels of quantization for each position of the pattern in the shift registers SR1 and SR2.

The character recognition circuitry includes a horizontal gap detector 32, a vertical data column 34, a mask matrix 36, a horizontal analyzer 38, a vertical analyzer 40 and feature extraction logic 42. In addition, there is also provided a feature storage register 44, font recognition logic 46, leading and trailing edge detector 48, character decode matrix 50, majority register 52, data select register 54, font characteristic register 56, font select register 58, character inhibit register 60 and encoder 62.

A central processor 64 is also provided which is interrelated with each of the components of the character recognition system including document scanner 20, the quantizers Q1, Q2 and Q3, the video shift registers SR1 and SR2 and the control gating 29 in order to provide the necessary control signals for the flow of data throughout the system.

The horizontal gap detector is connected via line 66 to the control gating 29 to detect actual gaps between characters to determine when a character ends and the next character begins. The vertical data column 34 is connected via line 68 to one line of the control gating 29 which is connected to a corresponding stage of each of the shift registers SR1 and SR2 to determine the height of a character and also provide information to the vertical analyzer to enable the document to follow a skewed line on a document.

The mask matrix 36 comprises the sub-feature masks and is connected via lines 70 to the control gating 29 to dedetermine the contents of the shift register windows in order to provide a combinatorial determination of the presence and absence of blank lines or areas for use in determining the features present in the shift register windows 30 in each of the three quantization levels.

The mask matrix 26 is connected via lines 72 to the feature extraction logic 42 which comprises the feature detectors, which determine the combination of sub-feature masks which have been enabled and which have not been enabled in order to detect which features have been located within the shift register windows.

The vertical data column 34 is connected via line 74 to the vertical analyzer 40. The vertical analyzer 40 senses a vertical data column to determine whether or not a scanner has been following a line accurately. That is, where a line is skewed (not exactly horizontal) on a document as the scan progresses along the line, the scan winds up either being too high or too low as it progresses along the line. The vertical analyzer keeps track of the location of the character within the scan to insure that the characters remain within the scan throughout the entire line. The vertical analyzer 40 also provides information via line 76 to the feature extraction logic 42 which enables the feature extraction logic to determine the portion of the character that is passing through window 30.

The horizontal gap detector 32 is connected via line 78 to horizontal analyzer 38. Horizontal analyzer 38 is connected via lines 80 and 82 to the feature extraction logic 42. Information is provided on lines 80 from the horizontal analyzer to the feature extraction logic 42 which indicates the horizontal portion of the character which is in the shift register window. Information is also provided on the output lines 82 of the feature extraction logic to the horizontal analyzer to provide information as to righthand features of a character that are detected so that if a true gap between two adjacent characters is not detected by the gap detector 32, the horizontal analyzer can still determine where one character ends and the next character begins from the features detected by the feature extraction logic.

The horizontal analyzer 38 is connected via line 83 to the leading and trailing edge detector 48 which receives information as to the coordinates of the leading and trailing edges of the character. The edge detector 48 is connected to the central processor 64 via lines 84. The coordinates detected by the leading and trailing edge detector 48 are fed via lines 84 to the central processor 64.

The feature extraction logic is connected to and provides the features detected via lines 86 to a feature storage register 44. The feature storage register 44 includes storage means for each of the possible features which can be detected in the characters of all of the fonts that the character recognition system is programmed to read.

Feature storage registers are connected via input lines 88 to output lines 90 to the central processor 64. The feature storage register is also connected to the character decode matrix via lines 92 and to the font recognition logic via lines 94.

The character decode matrix is connected to output lines 96 and 98 of the horizontal analyzer and vertical analyzer, respectively. Based on the information provided on lines 92, 96 and 98, the character decode matrix is capable of determining the character that has been scanned after the features of a character have been determined and stored in the feature storage register 44. The font characteristic register 56, the font select register 58 and the character inhibit register 60 are also connected to the character decode matrix via lines 100, 102 and 104, respectively. The font characteristic register is connected to and programmed by the central processor via line 106 to provide information via lines 100 as to the characteristics that are present in the font of typing such as serifs or characters that are sansserif.

The font select register 58 is also connected to and programmed by the central processor 64 via lines 108. The register 58 is set so that information is provided via lines 102 to the character decode matrix as to the particular font of characters that is being used. For example, the type used in one model of typewriters has varying features in its characters with respect to the type used in another model of typewriter. The combination of features that are required for each character is thus set up in the character decode matrix. The font recognition logic 46 is connected to central processor 64 via lines 109. The font recognition logic 46 is responsive to the feature storage register 44 to determine from the feature detected, the particular font of type which is used on a document. This font information is provided via lines 109 to the central processor which automatically programs registers 56 and 58.

The character inhibit register 60 is also connected to and programmed by the central processor 64 via lines 110. The character inhibit register is provided to inhibit a character when more than one character has been recognized by the character decode matrix 50. The character decode matrix is also connected to and fed information from the majority register 52 via lines 112. The majority register 52 provides signals on line 112 which indicate the number of features which can be missing in the detection of a character and yet still positively identify the character. The majority register 52 is also programmed by the central processor.

The output of the character decode matrix 50 is connected to the encoder 62 via lines 113. The output of the character decode matrix is thus sent via lines 113 to the encoder. The encoder 62 converts the signal on one line to a multibit binary code. In the preferred embodiment, a twelve bit binary code is provided on the output lines 114 of the encoder which are connected to the central processor for their recognition and processing of the character recognized.

The encoder 62 is also connected to and receives input signals via line 116 from the data select register 54. The data select register 54 is connected to and programmed by the central processor 64 via line 118.

The data select register provides information via lines 116 to the encoder which prevents the encoder from encoding any data which is not being examined. That is, where only upper case characters are desired, only the upper case characters that are recognized are encoded by the encoder 62 and provided to the central processor 64.

Similarly, where other data is required such as editing symbols, the encoder is enabled by the information provided on line 116 to encode the signals and provide the code to the central processor 64. The central processor is also connected to the video shift registers SR1 and SR2 via lines 120, 121, 122 and 123. The central processor provides, via lines 120 through 123, signals to shift the contents of the shift registers as the information from the document scanner and the encode matrix is received.

The central processor is also connected via lines 120 and 124 to the document scanner 20 and specifically the flying spot scanner therein to provide signals for either reducing or enlarging the scan or moving the scan up, down or sideways in order to completely encapsulate a character within the scan and to normalize the character within the scan.

The central processor 64 is also connected via lines 120 and 124 and via lines 125, 126 and 127, respectively, to the quantizers Q1, Q2 and Q3, respectively, to control the quantizing level of each of the quantizers Q1, Q2 and Q3.

The scanning of a character is diagrammatically illustrated in FIG. 6. FIG. 6 shows an upper case character "B" on a document as it is being scanned by a flying spot scanner. The path the flying spot scanner traverses on the document is represented by the solid lines 132 which include upwardly extending arrowheads to indicate the direction of movement of the flying spot scanner along the document.

The lines 134, which are shown in phantom indicate the return path of the flying spot scanner after each scan line 132 has been completed. It should be understood that FIG. 6 is an idealistic representation of a character which has ideal definition as well as an ideal difference in contrast between the field on which it is printed. That is, if the field that character 130 is printed on is black, it is assumed that character "B" is completely white or vice versa. Thus, assuming that character 130 is completely black and each of the quantizers Q1, Q2 and Q3 are set above the minimum black level above the background, each of the quantizers would produce a perfectly defined character "B" in terms of the quantization pattern that is fed to the shift registers SR1 and SR2.

Each of the quantizers Q1, Q2 and Q3 effectively samples the signal from the document scanner forty times for each line 132 that is traversed along the document. That is, the output of the photomultiplier is quantized forty times as the beam from the flying spot scanner makes one vertical stroke. The length of the strokes of the flying spot scanner are so normalized that the entire length of an upper case character 130 is the length of approximately 25 samples along the vertical stroke.

The character is also so located within the scan raster of the flying spot scanner that approximately ten samples along the vertical scan lines are taken below the character and five samples taken above the top of the character. It should be noted that lines 132 of the scan raster progress from a point which is to the left of and below the character to be scanned and wind up at a point which is to the right of and above the end of the character. The character recognition equipment includes feature detectors for the portions of characters which are disposed below the normal bottom edge of a line of characters such as the lower portions of lower case characters "*g*," "*p*" and "*y*." The feature extraction logic determines that the sub-bottom features are present and does not lower the scan raster with respect to the characters provided in the line. Thus, the bottommost edge of such a character would not be spaced within the raster so that the lowermost edge is ten samples above the bottommost portion of the scan raster.

It should also be noted that the sequence of the quantized samples provided from each of the quantizers Q1, Q2 and Q3 to the encode matrix 26 should be in the order of samples taken along lines 132 in FIG. 2. However, the scan raster need not follow lines 132. A preferred scanning pattern is illustrated in application, Ser. No. 675,236, filed Oct. 13, 1967 entitled Retrogressive Scanning Pattern. It should also be noted that the samples taken by each of the quantizers Q1, Q2 and Q3 are fed simultaneously on lines 23, 24 and 25 to the encode matrix 26. That is, sampled point 136 in FIG. 6 along the scan raster line 132 is quantized simultaneously by quantizers Q1, Q2 and Q3 and the outputs of the quantizers Q1, Q2 and Q3 are fed simultaneously to the encode matrix 26.

Figure 7:
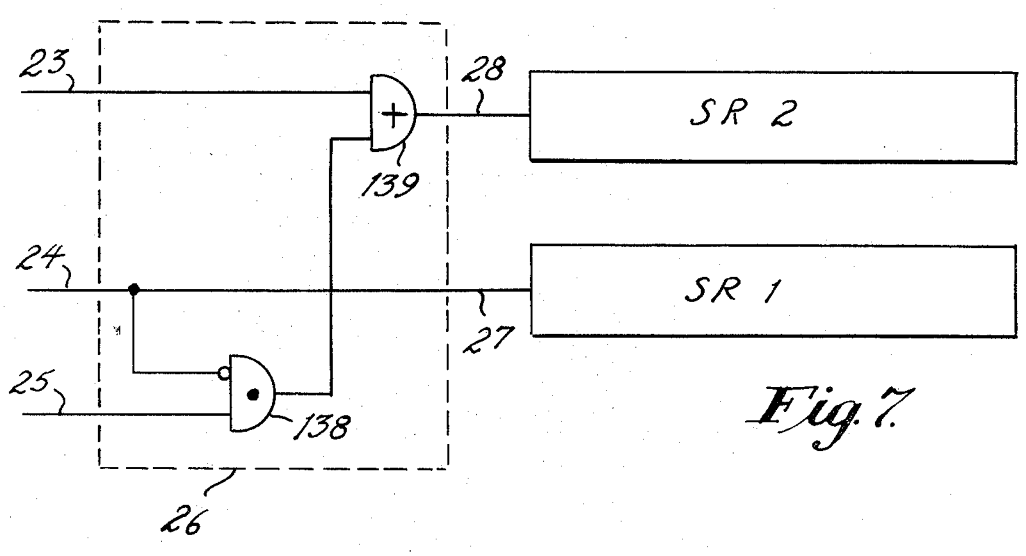
FIG. 7 is a schematic block diagram of the encode matrix.

As best seen in FIG. 7, the encode matrix 26 preferably comprises a coincidence gate 138 and an OR gate 139. The line 23 from quantizer Q1 is connected to a first input of OR gate 139. Line 24 from quantizer Q2 is connected to an inhibit input of AND gate 138 and is also connected directly through the encoder to the input of shift register SR1. Line 25 from quantizer Q3 is connected to the normal input of AND gate 138.

The output of AND gate 138 is connected to the other input of OR gate 139. The output of OR gate 139 is connected to the input of shift register SR2. Assuming that the bits shown in Chart I on page 7 hereof are presented during times t1 through t5, the outputs provided on lines 27 and 28 to shift registers SR1 and SR2, respectively, would be as follows in Chart II:

CHART II

| LINE $t1$ | | $t2$ | $t3$ | $t4$ | $t5$ |
|---|---|---|---|---|---|
| **27** (To SR1) | 1 | 0 | 1 | 0 | 0 |
| **28** (To SR2) | 1 | 0 | 0 | 0 | 1 |

It should be noted from the above chart and FIG. 7 that the preferred encoding enables the normal quantization level to be utilized to provide quantization signals directly to SR1 so that the binary quantization remains intact for a normal level to SR1. SR2, however, receives on line 28 the output of OR gate 139.

It should be noted that the signal on the output line of OR gate 139 is a binary "1" whenever either line 25 receives a binary "1" or all three of the lines 23, 24 and 25 receive a binary "1." In the case where a binary "1" is received on only line 25, since line 24 has a binary "0," AND gate 138 is not inhibited thereby and, thus, a "1" output is provided from AND gate 138 to OR gate 139 which is transmitted to line 28 to shift register SR2. However, if both lines 24 and 25 receive a "1," the "1" input on line 24 inhibits AND gate 138 thereby causing a "0" output therefrom and since line 23 is also receiving a "0" input, OR gate 139 will provide a "0" on line 28 to SR2.

When all three input lines receive a "0," the output of both lines 27 and 28 is "0." Similarly, when all three input lines receive a "1," both lines 27 and 28 have a "1" output thereon.

Various encoding schemes may be utilized for encoding the levels of quantization so that only two shift registers may be utilized for the three quantization levels. However, while two shift registers can handle up to four levels of quantization by proper encoding, the addition of another shift register enables eight levels of quantization. Thus, each additional shift register enables a doubling of the number of quantization levels that may be handled by the shift registers by proper encoding.

Figures 8, 9:
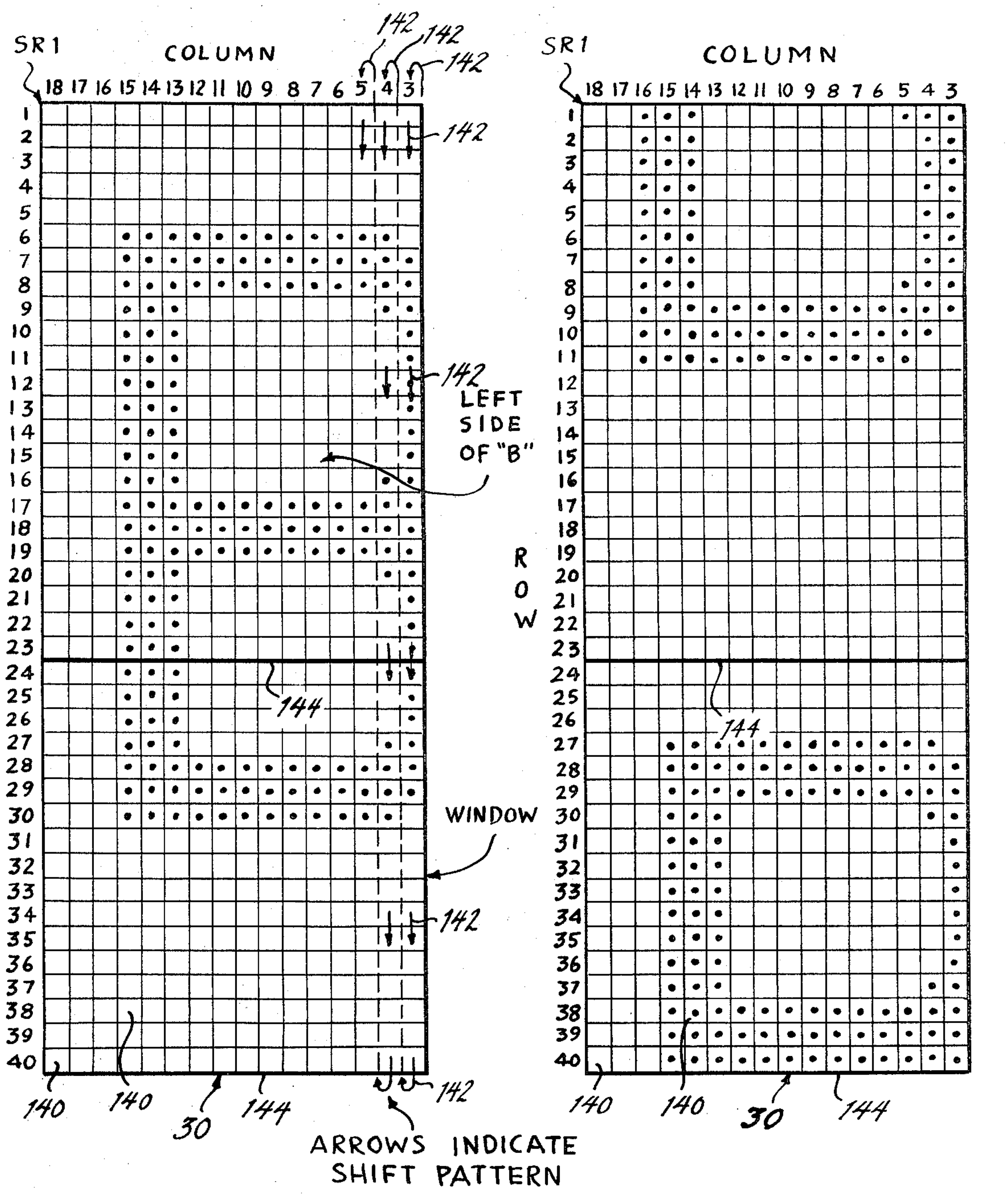
FIG. 8 and FIG. 9 are diagrammatic illustrations of the video shift registers to show the operation thereof.

The operation of the video shift registers SR1 and SR2 is identical and is illustrated in FIG. 8 which shows a diagrammatic illustration of SR1. Video shift register SR1 includes 720 stages which are serially connected together. The stages of the shift register can be considered to be provided in the form of eighteen columns having forty stages per column. Each of the stages of the shift register can also be considered to correspond to a location on a document through which the scan raster is progressing. Thus, as the scan raster progresses along the line in a field of a document, the binary quantized signals are provided on line 27 to the first stage of the shift register SR1. The shift register is so connected that the first forty stages of the shift register are provided in the first column. The bottommost or fortieth bit in the first column is connected to the first bit of the second column. The fortieth bit of the second column is connected to the first bit of the third column and so on through the seventeenth column, the fortieth bit of which is connected to the first bit of the 18th column.

As seen in FIGS. 8 and 9, the video shift register SR1 is diagrammatically illustrated as a rectangle having a plurality of boxes 140, each of which represents a single stage of the shift register SR1. The video shift register stages are each comprised of a flip-flop having output lines representative of the state of the shift register stage.

The quantized binary signal is shifted into the third through 18th columns of the shift register in the direction of arrows 142. It can therefore be seen that the information travels down column 3 from row 1 to row 40, progresses up to row 1 of column 4 and down column 4 until it reaches the fortieth row. The information is then shifted into the first row of column 5 and so on until the information in the register is shifted out the fortieth row of the 18th column.

The boxes 140, which are shown as blank in FIGS. 8 and 9, represent shift register stages that have a quantized binary signal representative of a white area of the document being scanned. The boxes which have a dot in the center thereof represent a shift register stage which has the quantized binary signal indicative of a black area being scanned. Thus, the blank boxes 140 can be considered to represent a "0" in the shift register stage and the boxes with a dot therein represent a "1" in the shift register stage.

It should be noted that the number of dots appearing in the boxes of shift register SR1 is dependent on the level of quantization at which the normal level is considered to be taken. In the idealized situation shown for purposes of example, the changing of the normalization level of quantizer Q2 would have little effect upon the pattern shown in FIG. 8 so long as the quantization level was taken between the reflectivity levels of a white area and a black area.

Shift register SR2 operates identically to SR1. However, in view of the encoding, the character pattern shifted through shift register SR2 would bear little relationship to the character which has been scanned. However, when utilized in connection with the control gating 29, the information in each quantization level is recaptured.

The video shift register window 30 of SR1 includes 272 stages of the video shift register SR1. The specific stages of the video shift registers SR1 and SR2 which are included in the windows 30 are those stages of the shift registers as represented by boxes 140 which are provided within the boundary of the thick solid line 144. The line 144 provides a periphery about the stages of the video shift registers SR1 and SR2 which are in column 3 through 18 and are within rows 24 through 40 of the shift registers SR1 and SR2. Thus, the windows are 16 stages wide by 17 stages high.

In FIG. 8, the shift register is illustrated with the binary quantization of the left side of a "B" shown as it is stored in the video shift register SR1 during one shift pulse time interval as it passes through the shift register SR1. The outline of the upper case character "B" takes shape in the form of the stages that are in the "1" state indicating that a quantized signal representative of a black portion on a document has been scanned. The stages in the shift register thereby correspond to a specific portion of the field of a document that has been scanned when the number of times that the character pattern has been shifted into the register is divisible by forty. That is, as seen in FIG. 8, the shift register corresponds to the area in the field that has been scanned since the bottom edge of character "B" is in row 30 which is ten samples or rows above the bottom of the scan raster.

The left side of the character "B" is illustrated within the shift register SR1 in FIG. 8 as the lower lefthand corner of the character "B" is being shifted into the window 30 of the shift register 28.

Referring now to FIG. 9, the shift register SR1 is diagrammatically shown after 21 shifts of the binary quantized pattern in the shift register after the position shown in FIG. 8. Thus, as can be seen, the bottom portion of the character "B" is now progressing through the top of the shift register SR1. Simultaneously, the lefthand top portion of the character is in a position within the window 30 for recognition of the top left feature of the character. Thus, as the character progresses through the shift register, all of the features in the character are at some time within the shift register window 30.

The scan of a field of a character is graphically illustrated in FIG. 10. FIG. 10 depicts a field on a document which has been divided into twelve zones. The zones are in three columns which are depicted as left, center and right and are labeled "L," "C" and "R," respectively. The zones are also segmented into four rows which are, respectively, top, middle, bottom and sub-bottom rows which are labeled as "T," "M," "B," and "SB," respectively. In order to be consistent with the earlier drawings, the upper case character "B" is illustrated on the field in the relationship in which it is scanned within a field. A dotted line 150 which is in the form of a rectangle corresponds to the window 30 of the shift register. It can be seen that the window 30 which is represented by the dotted line 150 is actually larger than each of the zones of the field. In addition, the window, as represented by the dotted line 150, can be considered to move about the field 148 in the same direction as the beam of the flying spot scanner progresses along the lines 132 in FIG. 6. Actually, as shown in FIGS. 8 and 9, the binary quantized character pattern is shifted through the shift register SR1 and causes the feature in the quantized character pattern to be shifted through the window.

Features within the characters, such as the lower lefthand corner, the upper lefthand corner, the middle of the lefhand side, are each detected individually and independently of each other. That is, since the entire character is not examined simultaneously, the individual features in the character are recognized independently of each other. This sequential detection of the features within the character enables a greater power of recognition because the features detected in a character are not dependent on each other. The further advantages of this feature extraction system are more specifically set forth in the aforementioned patent application, Ser. No. 774,280.

The use of quantization at a plurality of levels further increases the power of a feature recognition system because of the fact that the features, once they are recognized, are stored until enough features are present in order to recognize a character. Thus, as seen with respect to FIGS. 4 and 5 herein, the recognition of the top and left features of the character "E" in FIG. 4 is enabled in one quantization level whereas the recognition of the bottom features is enabled in another quantization level. The ability to recognize features of a character in different levels is enabled because detection of the features in a character need not be detected simultaneously in a predetermined relationship with respect to each other.

For example, if one upper case character "B" has a much larger bottom loop than top loop and a second upper case character "B" has an equal sized upper loop and lower loop, a system that required the simultaneous detection of features would not be able to recognize both of these characters as the character "B" since the relationship in space between the top lefthand corner of the "B," the lower lefthand corner of the "B" and the center left side of the "B" are differently spaced in relationship to each other. With respect to the various quantization levels, were it necessary to detect all of the features simultaneously, the quantization level of Q1 which is diagrammatically shown in FIG. 4 for detecting the character "E" in FIG. 3 causes an "F" to be recognized. However, at a different quantization level (i.e. FIG. 5, wherein quantization is at level Q3) where simultaneous feature detection is required, the character "E" would probably not be recognized at all.

The only differences between the upper case character "B" and the character numeral "8" are in the left side features of the characters. Where there is simultaneous examination of each of these features, the exact spacing between the top lefthand corner, the bottom lefthand corner and the middle left side of these characters becomes critical. However, where there is no dependence on the distance between each of the features, each of the features can be detected independently of each other thereby enabling relative size and thickness of line or spacing between the features to be irrelevant in the detection thereof.

Another reason for the greater power of detection when each of the features is individually examined is the fact that a greater exactness in the features can be required. Where simultaneous detection of features is required, there must be greater latitude in the feature masks thereby preventing, for example, the distinguishment of a curved character feature from a corner feature. Moreover, when the examination of each feature is made at a plurality of quantization levels for determining features, even greater exactness may be required for the feature because of the fact that there are a variety of levels of quantization at which the character can be examined.

By the provision of a window which is larger than each of the individual zones of a field, the feature can be looked for in greater detail in varying size with respect to the other features of the character. This is extremely important in proportional spaced typing wherein many letters take on different widths because of the squeezing and enlarging of the characters to fit in predetermined lengths of lines. Thus, even a book or a publication such as a newspaper, can be utilized in the character recognition system disclosed herein since there is no requirement of simultaneous detection of features. Thus, the spacing of the V-shaped features in a wide "W" or a narrow "W" in a proportional type system would cause no difficulty in the detection and recognition of the fact that a character "W" has been scanned.

Referring back to FIGS. 8 and 9, as the three levels of quantized binary pattern are shifted through shift registers SR1 and SR2, all three levels of the quantized binary pattern are examined for each position of the quantized pattern in the two shift registers. That is, after each shift pulse, three timing signals C1, C2 and C3 are generated in sequence between the shift pulses and provided on lines 121 to control gating 29. During the first control pulse, C1 causes the control gating to provide the binary quantization of the character pattern at level Q1 which is presently stored in shift register windows 30 of the shift registers SR1 and SR2. During the second pulse C2 to the control gating 29, the binary quantization taken at level Q2 is read out of the control gating and during the pulse C3, the quantization level Q3 from the shift register window is read out by the control gating 29.

The control gating 29 is best understood by referring to FIG. 11 wherein a portion of shift register windows 30 of SR1 and SR2 are connected to a portion of the control gating. The control gating 29 basically comprises a plurality of gates 151 which are connected between each of the stages of the shift register window.

For purposes of clarity, each stage of the shift registers is identified in accordance with its row and column. For example, the stage which is in column 18 and row 24 is hereinafter referred to as 24,18. Similarly, any reference to a line connected to the output of gates 151 is marked with a legend similar to the stages of shift register window 30 to which the inputs of gates 151 are connected. For example, the outputs of stages 40,3 of both shift register windows 30 of shift register SR1 and SR2 are connected to a first gate 151. The output line of this gate 151 is referred to hereinafter as line 40,3.

Each of the gates 151 is connected to one stage of the shift register window 30 of shift registers SR1 and SR2. Corresponding stages of each of the shift register windows 30 of SR1 and SR2 are connected to the same gate 151. Thus, for example, it can be seen in FIG. 11 that stages 38,3 of shift register windows 30 of SR1 and of SR2 are connected only to the rightmost gate 151 shown in FIG. 30.

Each of the gates 151 also includes three control input lines C1, C2 and C3 which receive the control pulses C1, C2 and C3, respectively, from lines 121 (FIG. 1).

Each of the gates 151 is similarly comprised. The gate 151 (having its periphery in phantom in FIG. 11) connected to stages 39,3 of shift register windows 30 of SR1 and SR2 is shown in detail therein and basically comprises three AND gates 152, 153 and 154, respectively, and two OR gates 155 and 156.

Line C1 is connected to a first input of three input AND gate 152. Line C2 is connected to one of two inputs to AND gate 153 and line C3 is connected to a first input of a two input AND gate 154. The output line of stage 39,3 of SR1 is connected to the second input of AND gates 152 and 153 and a first input of OR gate 155 and a third input of AND gate 152. The output of OR gate 155 is connected to the other input line of AND gate 154. The output lines for AND gates 152, 153 and 154 are connected to the input of OR gate 156. The output of OR gate 156 represents the output of gate 151 and is denoted with the legend 39,3 which refers to the corresponding stages of the windows 30 which are connected to the gate 151.

Each of the gates 151 acts as a decoder to reconstruct each of the three levels of quantization which are coded into the two registers SR1 and SR2. Each time a pulse is received on lines C1, the output from OR gate 156 of each of gates 151 should be the binary quantization at level Q1. During a pulse on lines C2, the binary signals from each of the gates 151 correspond to the binary quantization at level Q2 and similarly during a pulse on lines C3, the output of the gates 151 is the binary quantization at level Q3.

Accordingly, it can be seen that AND gate 152 is enabled only during the following simultaneously occurring events: a "1" in the corresponding stage of SR1, a "1" in the corresponding stage of SR2, and a pulse on line C1. It can therefore be seen that during a pulse on line C1, the output of OR gate 156 can be "1" only if a "1" is in the corresponding stages of SR1 and SR2 indicating that the sample taken at quantization level Q1 is a binary "1." AND gate 153 can be enabled only during a pulse on line C2 and when a "1" is present in the corresponding stage of shift register SR1. This condition represents a binary "1" sample at quantization level Q2. Similarly, AND gate 154 is enabled only during the pulse on line C3 and when a "1" is in the stage of the shift register SR1 or SR2 connected to the OR gate 155. This condition corresponds to a "1 " in quantization level Q3. The following Chart III represents the outputs from OR gate 156 of gate 151 which is connected to stages 39,3 of shift registers SR1 and SR2 when the bits generated during periods *t1*, *t2*, *t3*, *t4* and *t5* in Chart II on page 19 hereof are in the stages 39,3 of both shift registers SR1 and SR2.

CHART III

| LINE 39,3 | t1 | t2 | t3 | t4 | t5 |
|---|---|---|---|---|---|
| C1 (Q1) | 1 | 0 | 0 | 0 | 0 |
| C2 (Q2) | 1 | 0 | 1 | 0 | 0 |
| C3 (Q3) | 1 | 0 | 1 | 0 | 1 |

In Chart III, during pulses C1, C2 and C3, the outputs on line 39,3 are as shown when the bits generated in the periods *t1* through *t5* are in stage 39,3.

It can therefore be seen that Chart III is identical to Chart I on page 7 hereof. That is, the binary quantization at each of the levels Q1, Q2 and Q3 is reconstructed by the control gating 29.

Each feature in a character is detected by examining the combination of various white areas and black areas on the document simultaneously. These white and black areas on a document are detected by the mask matrix 36 which is connected to the output of the control gating 29. Each feature is detected by requiring the simultaneous detection by a predetermined combination of the sub-feature masks, the pattern desired.

Thus, during the period of pulse C1, the output lines from the control gate are examined to determine whether any feature is detectable in a first quantization level, during pulse C2, all of the output lines from the control gating 29 are examined to determine whether a feature is detectable in a second quantization level and during the third pulse C3, the output lines are again examined to determine whether any feature is detected in a third quantization level. Even though the same feature may be detected in all three of the quantization levels, the feature storage register receives this information for determining the character as soon as the feature is detected the first time.

The additional detection of the same feature is discarded as redundant information. It should again be noted that all three of the examinations of the binary patterns at the three different quantization levels are accomplished within the period of a single shift pulse span. That is, because the gating circuitry works much faster than the shifting of the patterns through the shift register windows 30, the examination of the patterns for each of the three levels does not require any additional time.

The sub-feature masks which are responsive to the video shift register are described in detail in the aforementioned application, Ser. No. 774,280. For ease of reference, one of the combinations of sub-feature masks to detect a character is diagrammatically illustrated in FIG. 12. FIG. 12 is a diagrammatic representation of the sub-feature masks which are necessary to detect the feature in the top lefthand corner of the upper case character "B" or the upper case character "E" among other characters. FIG. 12 depicts the stages in the shift register windows 30 as shown in FIGS. 8 and 9 with the sub-feature masks superimposed over the stages of the shift register that the masks are connected to via the control gating 29.

The mask matrix in FIG. 12, thus, comprises sixteen columns by seventeen rows of boxes. The columns are labeled 3 through 18, respectively, and the rows are labeled 24 through 40, respectively, to correspond with the stages of the shift register window 30 which are in columns 3 through 18 and rows 24 through 40. Thus, a box at the intersection of column 3 and row 24 in the feature mask matrix shown in FIG. 12 corresponds to stages of the shift register windows 30 in column 3 row 24 as depicted in FIG. 8 or FIG. 9. It can therefore be seen that the detection of the top left feature of either the character "B" or the character "E" requires the satisfaction of sub-feature masks LTH, CTH and RTH, LTV, LMV and LBV, H100, V100 and Y207 and X207. The shaded masks (in other words those masks as shown with cross-hatchings therein) represent negative masks which are provided to detect the white area on a document. The masks which are blank (i.e. those having no cross-hatchings) represent positive masks (i.e. those masks which detect black areas on a document). Where the negative masks overlap, as is the case with LTH and LTV, the common areas include cross-hatchings in opposite directions. The parts of the masks which are not common include cross-hatches in only one direction. Where the positive masks overlap (for example, masks V100 and H100) the borderlines of both overlap in the common areas.

The sub-feature masks in FIG. 12 include within the boundary thereof each of the boxes which correspond to the stages that the masks themselves are connected to via the control gating 29. For example, in positive mask V100, eighteen boxes are encompassed which correspond to the stages of the shift register in columns 13 and 14 between rows 28 to 36, inclusive. For purposes of clarity, a stage is identified in accordance with its row and column as set forth above. Accordingly, as set forth above, any reference to a line from the output of one of the gates 151 connected thereto is shown with a similar legend.

Mask V100 is an exemplary positive feature mask which is provided to detect a vertical line in a feature and is illustrated schematically in FIG. 13. Mask V100 basically comprises nine OR gates 160 through 176, each of which comprises a pair of diodes 178 and 180 which are connected together at one end to a resistor 182.

Each of the resistors 182 is connected at its other end to a buss line 183 which is connected to a source of positive voltage (+V DC). Each of the diodes of each of the OR gates is connected at its other end to one row in columns 13 and 14. That is, diodes 178 and 180 of OR gate 160 are connected to stages 28,14 and 28,13, respectively, of the shift register window via the control gating associated with these stages. The encircled lines 184, each of which includes a pair of numbers, refers to the stage in the shift register window by the row and column designation therein that the line is connected to via the control gating. Therefore, diodes 178 and 180 are connected to the outputs of gates 151 of control gating 29 which are connected to stages 28,14 and 28,13, respectively, of windows 30.

Similarly, diodes 178 and 180 of OR gate 162 are connected to stages 29,14 and 29,13, respectively. The diodes 178 and 180 of OR gate 164 are connected to stages 30,14 and 30,13, respectively. The diodes of OR gate 166 are connected to stages 31,14 and 31,13, respectively. The diodes of OR gate 168 are connected to stages 32,14 and 32,13, respectively. The diodes of OR gate 170 are connected to stages 33,14 and 33,13. The diodes of OR gate 172 are connected to stages 34,14 and 34,13. The diodes of OR gate 174 are connected to stages 35,14 and 35,13. The diodes of OR gate 176 are connected to stages 36,14 and 36,13.

Mask V100 further includes nine diodes 186 and 202 which are each connected at a first side to a buss line 204. The other sides of diodes 186 through 202 are connected to the outputs of OR gates 160 through 176, respectively. The diodes are connected to the common point between the diodes of the OR gates and the resistors of the OR gates. Bus line 183 which is connected to the positive source of voltage is also connected to an analog comparator via resistor 208 and to ground via resistor 208 and resistor 210. The first input line 212 to the analog voltage comparator is connected between the resistors 208 and 210 which thereby form a voltage divider between the positive source of voltage and ground. A second input of the analog voltage comparator 206 is connected to the buss line 204. The buss line 204 is also connected via resistor 216 to ground. The diodes 186 through 202, in combination with comparator 206, act to form a majority gate which is enabled if eight of the nine OR gates are enabled.

The output lines of the control gating 29 are at ground if the binary quantization of the field in which the character has been scanned is representative of the "1" state or indicative of a black area on the field. If the binary quantization of the signal at a particular area is "0," or a white field is detected, a signal of positive polarity is provided by the stage of the register.

As long as one input to the diodes of the OR gates 160 through 176 is at ground, the output of the OR gate is also at ground. Thus, if all nine OR gates are enabled (in other words at least one of the inputs to each of the OR gates is at ground), the voltage at input line 214, the negative input line of the comparator 206, is less positive than the voltage to line 212, the positive input of the comparator 206. When the voltage at line 214 is less positive than at line 121, the condition causes the comparator to indicate a correclation in the mask V11 thereby producing a positive output voltage on the output line 218 of the com-parator 206. As long as the output line is positive, it indicates that there is a positive correlation indicating that the mask conditions have been satisfied.

The comparator 206 is also enabled as long as no more than one of the OR gates 160 through 176 is not enabled. That is, if one of the OR gates is not enabled, it can be seen that the diode 186 through 202 which is associated with the OR gate becomes conductive thereby causing a positive voltage at line 214. The resistors 182 and 216 are so chosen that the voltage at line 214 is less positive than the voltage at line 212. However, if more than one OR gate is not enabled, there is conduction via two of the resistors 182 thereby causing the voltage at line 214 to increase thereby exceeding the voltage on line 212 and thereby causing the comparator to produce an output signal which is at ground.

Referring back to FIG. 12, it can therefore be seen that mask V100 correlates with the pattern provided in the window of the video shift register as long as eight out of nine rows in adjoining columns in the shift register has a "1" in at least one of the columns. This correlation is specifically provided so that a line which is not exactly vertical still is recognized as a feature so long as one side or the other of the column is detected in eight of the nine rows of the two columns.

It should be noted that positive masks similar to V100 are provided with as many, more or less than the number of OR gates shown in FIG. 9. As long as each of the OR gates is similar in resistance to resistors 182, the comparator 206 is enabled so long as all of the OR gates or all of the OR gates except one are enabled.

Thus, for example, the positive mask H100 is essentially identical to mask V100 except that only six of the OR gates are used and only six of the diodes 186 through 202 are used in combination with the comparator 206. Each of the OR gates is connected to the two stages in a different one of the columns that mask H100 is associated with. That is, the first OR gate is connected to the stages 28,13 and 29,13 of the shift register window 20. Similarly, the second OR gate is connected to stages 28,12 and 29,12; the third OR gate is connected to stages 28,11 and 29,11; the fourth OR gate is connected to stages 28,10 and 29,10; the fifth OR gate is connected to stages 28,9 and 29,9; and, the sixth OR gate is connected to stages 28,8 and 29,8. If five out of the six OR gates are enabled, the comparator of mask H100 provides the positive signal on its output line 218. Similar considerations are utilized in each of the remaining positive masks.

In the case of curved positive masks to detect curved sub-features, the stages are connected in pairs to the OR gates along the path of the line. Thus, as long as one of the stages is in the black or "1" state substantially along the length of the curved line, there is a sufficient correlation to the sub-feature mask.

A positive feature mask may also include OR gates with more than two diodes. The stages would again be connected in pairs or larger to the OR gate along the path of the line. The larger grouping of stages enables greater latitude in the correlation of a curved sub-feature. That is, the direction of curvature can vary slightly without affecting correlation.

A negative mask is exemplified by mask CTH which is shown in FIG. 14. Referring back to FIG. 12, it can be seen that mask CTH detects a horizontal bar or a line of white on a document in the center top of the window 30. Mask CTH basically comprises six AND gates 220, 222, 224, 226, 228 and 230, each of which comprises three diodes 232, 234 and 236 and a resistor 238. One side of each of the diodes is connected to resistor 238 and the opposite side is connected to the stages in one row of each of three columns. That is, the AND gate 220 is connected to stages 24,11; 24,12; and 24,13 of the windows via the control gating 29. AND gate 222 is connected to stages 25;11; 25,12 and 25,13. AND gate 224 is connected to stages 26,11; 26,12; and 26,13. AND gate 226 is connected to stages 24,8; 24,9 and 24,10. AND gate 228 is connected to stages 25,8; 25,9; and 24,10. AND gate 230 is connected to stages 26,8; 26,9; and 26,10. Each of the resistors 238 of the AND gates 220 through 230 are connected to a buss line 240 which is connected to a positive source of voltage (+V DC).

Mask CTH further includes six resistors 242, 244, 246, 248, 250 and 252. Resistors 242 through 252 are connected at one end to the output of AND gates 220 through 230, respectively. Resistors 242, 244 and 246 are connected at their other end to one side of a diode 254 and the other ends of resistors 248, 250 and 254 are connected to one side of diode 256.

An analog voltage comparator 258 is provided which has a negative input line 260 and a positive input line 262. The positive source of voltage is connected to ground via a voltage divider comprised of resistors 264 and 266. The positive source of voltage is also connected via resistor 264 to the negative input line 260 of the comparator 258 and to the other side of diodes 254 and 256 via resistor 268 to the positive input line 262 of the comparator 258.

Sub-feature mask CTH is connected to the true output lines of the stages of the shift register windows 30 via control gating 29 which are at a positive voltage when the register indicates that a white area has been scanned and ground when a black area has been scanned.

Thus, AND gates 220 through 230 are enabled only when each of the three inputs to the specific gate is at a positive voltage. The values of the resistors provided in mask CTH are such that if two out of three AND gates 220 through 224 are enabled, and two out of the three AND gates 226 through 230 are enabled, comparator 258 will receive a signal on line 262 which is more positive than the signal on line 260 thereby causing the comparator to produce a positive output signal on output line 270.

It can be seen that the resistors 242, 244 and 246 in conjunction with diode 254 and resistors 248, 250 and 252 in combination with diode 256 act in conjunction with comparator 258 as two out of three majority gates. Thus, if three out of three AND gates 226 through 230 are enabled, diode 256 is cut off thereby causing the comparator 258 to be responsive to the input signals on lines 242, 244 and 246 to diode 254. Thus, as long as two out of three of the AND gates 220 through 224 are enabled, the voltage is high enough on diode 254 to cause line 262 to be higher in voltage than line 260 to the comparator 258.

Where both sets of AND gates (i.e. 220 through 224 and 226 through 230 have only two out of three AND gates enabled, the voltage provided by both diodes 254 and 256 is equal thereby maintaining a higher voltage on line 262 than on line 260, thereby causing the comparator to produce a positive output signal on line 270 which indicates a correlation of the sub-feature mask to the area on the field which has been scanned.

The theory of operation of the negative feature masks such as mask CTH is best seen in connection with FIG. 12. For purposes of detection, the mask CTH can be considered to be broken up into two portions, a first portion of which is responsive to three stages in columns 11, 12 and 13 of the shift register window and a second portion which is responsive to three stages in columns 8, 9 and 10 of the shift register window 30. Whenever all three stages in two or three out of the three rows in each of the two portions are present, the mask CTH is satisfied.

In addition to the large sub-feature masks such as CTH, RTH, and LMV which are provided around the periphery of the window, small negative masks are also provided which require less tolerance for correlation. The smaller masks are normally designated with either an "X" or a "Y" followed by a numeral and are responsive to either six stages of the register such as sub-feature mask X207 (FIG. 6A) or to nine stages of the shift register window. Examples of sub-feature masks for six and nine stages are shown in the aforesaid application, Ser. No. 774,280.

The positive sub-feature masks such as V100 and the negative sub-feature masks such as mask CTH are connected to the true output of the stages of the shift register window via the control gating, the negative mask gates such as X207 are connected to the inverted output of the stage via the control gating. That is, if the true output line is at a positive voltage, the inverted output line is at ground and vice versa. The inverted outputs of the stages in shift register 30 are connected to gates 151 of control gating 29 in the same manner as the true outputs.

As hereinbefore set forth, FIG. 12 is a diagrammatic illustration of the logic for the detection of the top lefthand corner of an upper case character "B." However, it should be understood that the same feature detection mask is also used in the following characters: upper case "B," "E," "F," "P," "R" and in the numeral "5."

The schematic block diagram of the feature detector for the top lefthand corner feature of the character "B" is shown in FIG. 15. The feature detector basically comprises ten diodes 294, each of which is connected to one of the outputs of sub-feature masks or mask gates associated with the top lefthand corner feature of the character "B." The top lefthand corner feature detector also includes diode 296 which is connected to the output of the top strobe 298 and the diode 300 which is connected to the output of the left strobe 302. Each of the diodes 294, 296 and 300 are connected at their other end in common to the input line 304 of inverter 306.

The output of inverter 306 is connected to the input line 308 of flip-flop 310. The flip-flop 310 also includes input line 312 which is used to reset the flip-flop after a character has been recognized. The flip-flop 310 includes two output lines 314 and 316 which are, respectively, at positive and ground when a feature is recognized and at ground and positive when a feature is not recognized.

As hereinbefore set forth sub-feature masks V100, H100, X207, Y207, RTH, CTH, LTH, LTV and LMV and LBV are connected to the video shift register window via gating 29 as diagrammatically illustrated in FIG. 12. It should be understood that these sub-feature masks are utilized not only for the top lefthand corner feature of the upper case character "B" but are also utilized for other features. Each of the feature detectors thus comprise a plurality of diodes which are connected to a specific combination of sub-feature masks which are required to detect the specific feature.

Diodes 294, 296 and 300 must all receive a positive signal in order to have the inverter 306 provide a ground signal to the flip-flop 310 which sets the flip-flop thereby indicating recognition of the top lefthand feature of the character "B." Thus, each of the masks V100 through LBV must be enabled at the same time that the top strobe and the left strobe 298 and 302, respectively, are enabled.

The top strobe 298 provides an enabling signal to diode 296 only when the top portion of a character is passing through the shift register window 30. Similarly, the left strobe is enabled only when the left portion of a character is passing through the shift register window 30. Thus, not only must all of the masks associated with the top left feature of the character "B" be enabled, but also the proper portion of the character must be in the window in order to cause enablement of the detector of the specific feature.

Thus, in operation, when the enabling signal from all of the sub-feature masks in the top and left strobe are provided to the inverting buffer 306, the signal on the output line 308 of the buffer goes to ground thereby causing the flip-flop to be set which is indicative of the top lefthand corner feature having been detected. This flip-flop is, thus, set until such time as the entire character is recognized. Flip-flop 310, therefore, acts as a storage of the top left-hand corner of the feature. The top strobe and left strobe which were referred to in connection with FIG. 15 herein are provided by the horizontal and vertical analyzers which are shown and described in the aforementioned application, Ser. No. 774,280.

It should be noted in connection with FIG. 15 that control gating 29 provides three levels of binary quantization for each position of the character pattern in the shift registers SR1 and SR2 of the sub-feature masks.

This means that while the top and left side portions of the character are within the window, the masks are provided with all three levels of binary quantization by the control gating 29.

It can therefore be seen that even though the masks may recognize the same feature three times, additional or subsequent pulses on line 308 merely drive flip-flop 310 further into the set state and are thereby rendered redundant. However, so long as the feature is detected in any of the three quantization levels, the flip-flop 310 is set.

It can therefore be seen that the horizontal and vertical analyzers effectuate the feature logic only during the periods or areas in which specific feature detectors examine the characters. This strobing within predetermined periods, in effect, assigns or provides the features detected with an address within the character itself.

The periods of the strobe enabling signals are long enough to provide sufficient latitude in the detection of the various features so that specific shapes of features can be accurately defined during detection. That is, since the relative location of a character sub-feature within the character is not held within rigid requirements, the shape of the sub-feature masks can be more specifically defined since the sub-feature has room to be fitted into correlation with the mask.

Referring back to FIG. 12, it can be seen therein that the top lefthand corner feature is detected when the top and left strobe signals are provided to the top lefthand corner feature logic and each of the sub-feature masks are enabled simultaneously. Thus, feature logic assigned to the remaining portions of the character "B" have feature masks which are enabled only during the period in which the specific features looked for is passing through the shift register window. For example, the center bar in the character "B" can only be detected during a strobe which indicates that the middle and center portions of a character are passing through the window.

Because each feature is detected independently of the remaining features, an L-shaped feature is readily distinguishable from a curved feature having both the horizontal and vertical component which is connected by a curved intermediate portion. The reason is that since the feature is independent of the rest of the character, more attention can be paid to the linearity of the components of the corner feature because the location thereof with respect to the rest of the feature is relatively independent.

The importance of the independent feature recognition is best understood in connection with the recognition of a character "8" or a character "B." The character "8" and the upper case character "B" are very similar to each other with the right side and central features of the figure "8" being very similar to the character "B."

It can therefore be seen that the essential differences between the character "B" and the character "8" are all in the left side features. In prior character recognition systems, the important area in the character "8" that could be distinguished from the upper case character "B" was in the middle lefthand portion of the character. However, in the character recognition system utilizing feature extraction, the feature extraction enables the distinguishment in three specific areas between the character "8" and the upper case character "B."

Thus, feature detectors utilized for detecting the curved top left portion of a character "8," the bottom lefthand corner of the character "8" and the central lefthand side of the character "8" can be utilized in connection with the feature detectors for the character "B" to provide additional correlation for the detection of the character "B."

For example, FIG. 16 is a schematic block diagram illustrating the operation of the character recognition associated with the detection of the character "B." A feature register is diagrammatically depicted therein at 520 which includes flip-flops for each of the features considered in connection with the detection of the character "B." The upper case character "B" decoder recognizes the character "B" if each of the features illustrated within the boxes 522 of the register 520 are present. For each of the features which are examined there is provided in the top row, the sense in which the feature provided therebelow is examined. The provision of a "+" in the top row of register 520 indicates the detection of the feature is required. The provision of a "—" in the box in the top row of the register indicates that it is the absence of the character which is required.

Thus, as seen, the rightmost three features which are required are the features in the left side of a character "8." Therefore, rather than requiring their presence, the absence of these features is required. Each of the features which are illustrated within the boxes 522 of the register 520 are provided in the row and column of boxes in which the horizontal analyzer and vertical analyzer provide strobes to their respective feature detectors.

That is, the bottom lefthand corner features of a seriffed bottom left corner feature and a sansserif lefthand corner feature are sensed when the bottom and left strobes are provided to the feature detectors for these features. It should be noted that if either the serif feature or the sansserif feature is present, the bottom left feature of the upper case character "B" is present. Similarly, if either the seriffed or sansseriffed top left corner feature is present, the top left side feature of the upper case character "B" is detected.

A schematic diagram of the connections of the character recognition unit with the particular connections to the feature storage flip-flops is shown in the aforesaid United States application, Ser. No. 774,280. It should also be noted that the "B" decoder which is connected to the storage flip-flops is enabled when a predetermined number of the features required in the character "B" are detected. That is, the majority logic 52 from the central processor determines what degree of correlation is necessary in order for the character "B" to be recognized. For example, in the case of the upper case character "B," it may be enough when all but one of the features detected are present to be reasonly sure that it is a character "B" and not a character numeral "8" which has been detected.

It should therefore be noted that the provision of the programmable threshold level enables the determination of a character where various features have not been detected for one reason or another. Also, where no characters are detected during a character scan, the character can be looked for with the closest correlation by lowering the correlation level provided to all of the threshold decoders for all of the characters.

Thus, the probability of not recognizing a character or confusing characters detected is substantially reduced. The utilization of the binary quantization at a plurality of threshold levels further enables the detection of a larger number of features without the necessity of rescanning.

It can therefore be seen that a new and improved character recognition system has been provided. The multilevel quantization further adds to the power of the character recognition capability of the feature extraction shown in the aforesaid application, Ser. No. 774,280.

The use of an encode matrix enables all three levels of quantization to be examined using only two shift registers which carry the binary quantization signals. It should also be understood that the encode matrix can be eliminated and three shift registers provided to carry the quantization signals at each of the levels. In this case, the control gating 29 would be comprised of AND gates which were gated to provide the quantization levels from each of the shift registers in sequence.

The feature extraction which utilizes feature storage enables the storage of features from each of the quantization levels so that not only is the character recognition of features independent of other features in terms of spatial relation, but also in terms of quantization levels. This means that not only does the provision of the binary quantization levels on a multiplex basis provide the equivalent of a plurality of scan of a character, but also features may be detected in the various scans of the feature for providing the character recognition.

Without further elaboration, the foregoing will so fully illustrate my invention that others may, by applying current or future knowledge, readily adapt the same for use under various conditions of service.

What is claimed as the invention is:

1. In a character recognition system including a serial storage means having a plurality of stages for serially storing and shifting a signal representative of a binary quantization at a plurality of darkness levels of a character pattern sampled within a field on a document, means for recognizing a character in said storage means, said means for recognizing being connected to a plurality of said stages of said storage means via gating means, encoding means for converting a plurality of binary quantizations into a coded signal representative of said plurality of binary quantizations and said gating means include decoding means for converting said coded signal into each of said plurality of binary quantizations, and control means connected to said gating means for sequentially providing to said means for recognizing said binary quantization at each of said plurality of levels so that all of said levels of binary quantization are provided to said means for recognizing prior to the shifting of said binary quantization to the next succeeding stages of said storage means as said binary quantization passes through said storage means.

2. The character recognition system of claim 1 wherein said decoding means is selectively actuable by control signals to convert said coded signal to any one of said plurality of binary quantizations at a time, said control means providing control signals to said decoding means to cause sequential conversion of said coded signals to each of said plurality of binary quantizations.

3. The character recognition system of claim 2 wherein said means for recognizing include feature recognition means, said feature recognition means receiving each of said plurality of quantizations so that a feature may be recognized in any of said plurality of quantization levels.

4. The character recognition system of claim 3 wherein said feature extraction means includes storage means to enable storage of the recognition of each feature detected in said plurality of quantization levels so that a character can be recognized by the combination of features detected at a plurality of quantization levels.

5. In a character recognition system including a serial storage means having a plurality of stages for serially storing and shifting a signal representative of a binary quantization at a plurality of darkness levels of a character pattern sampled within a field on a document, means for recognizing a character in said storage means, said means for recognizing being connected to a plurality of said stages of said storage means via gating means, control means connected to said gating means for providing to said means for recognizing said signals representative of a binary quantization at a plurality of darkness levels, said control means including means for providing from said signal representative of a binary quantization at a plurality of darkness levels, a binary quantization of each darkness level of said plurality of levels in sequence so that each darkness level represented by said signal in said storage means is provided individually and sequentially to said means for recognizing at each location of said signal in said storage means before the signal is shifted serially to the next location in said storage means.

* * * * *